United States Patent
Krüger et al.

(12) 
(10) Patent No.: US 6,333,821 B1
(45) Date of Patent: Dec. 25, 2001

(54) OPTICAL ELEMENTS

(75) Inventors: Hartmut Krüger, Berlin; Waltraud Neumann, Teltow; Andreas Bräuer, Schlöben; Peter Dannberg, Jena, all of (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/581,627

(22) PCT Filed: Dec. 15, 1998

(86) PCT No.: PCT/EP98/08575

§ 371 Date: Jul. 17, 2000

§ 102(e) Date: Jul. 17, 2000

(87) PCT Pub. No.: WO99/31533

PCT Pub. Date: Jun. 24, 1999

(30) Foreign Application Priority Data

Dec. 15, 1997 (DE) .............................. 197 55 627

(51) Int. Cl.⁷ ..................... G02B 11/00; C08G 63/02
(52) U.S. Cl. ............... 359/642; 528/190; 528/191; 528/193; 528/194; 358/901.1; 359/678; 359/831; 524/81
(58) Field of Search .................... 528/190, 191, 528/193, 194; 358/901.1; 359/642, 678, 831; 524/81

(56) References Cited

U.S. PATENT DOCUMENTS

| 3,824,211 | 7/1974 | Howerton . |
| 4,477,555 | 10/1984 | Oba et al. . |

FOREIGN PATENT DOCUMENTS

| 0 076 133 A1 | 4/1983 | (DE) . |
| 34 29 074 A1 | 2/1986 | (DE) . |
| 0 184 716 A1 | 6/1986 | (DE) . |
| 39 15 734 A1 | 11/1990 | (DE) . |
| 39 27 498 A1 | 2/1991 | (DE) . |
| 0 242 959 A1 | 10/1997 | (DE) . |
| 0 003 294 A1 | 8/1979 | (EP) . |
| 0 323 561 A2 | 7/1989 | (EP) . |
| H61-5986 | 1/1986 | (JP) . |
| H61-144738 | 7/1986 | (JP) . |

OTHER PUBLICATIONS

Takezawa et al, "Polymer Optical Fiber for Near Infrared use" Journal Of Applied Polymer Science, vol. 49, pp. 169–173, XP002101145.

*Primary Examiner*—Samuel A. Acquah
(74) *Attorney, Agent, or Firm*—Sughrue Mion, PLLC

(57) ABSTRACT

The invention relates to optical elements comprised of an optical isotropic completely aromatic polyester with a glass transition temperature $T_g \geq 180°$ C.

15 Claims, No Drawings

OPTICAL ELEMENTS

SUMMARY

The invention relates to optical elements from an optically isotropic, fully aromatic polyester with a glass transition temperature $T_g \geq 180°$ C.

DESCRIPTION

The invention relates to optical elements made of optically isotropic plastic and especially those made of a fully aromatic polyester with a glass transition temperature $T_g \geq 180°$ C.

Organic polymers are of increasing interest as materials for use in optics, micro optics, integrated optics, optical telecommunications technology and microsystems technology. In this context, they have found many uses in components of optical equipment, as well as in special optics such as lenses, lens arrays, prisms, mirrors, and as a transparent coating material for optical components. There is an especially large demand for optical components in optical telecommunications technology, optical interconnection technology, and optical sensory technology. Some examples of the components that are in demand are branching devices, couplers, beam re-routing units, optical switches and attenuation structures. These optical elements can be manufactured from typical semiconductor materials, and especially from organic polymers.

Polymers can generally be processed technologically advantageously through injection molding, stamping technology or from a solution.

The desired characteristics of such a polymer for optical use are the least possible optical attenuation at the relevant wavelengths (in optical telecommunications technology, preferably 1.3 and 1.5 μm), high resistance to moisture, the greatest possible stability against temperatures, especially in terms of the optical characteristics, a variable refraction index for adjusting to the specific requirements of the components, and good processability.

Especially when it is used as a waveguide, many demands are placed on the polymer. The refraction index of the material should be as variable as possible and adjustable to the particular substrate. When used in optical telecommunications technology, low material absorption at 1.3 and 1.5 μm is required, i.e. an optical loss of less than 1.0 dB/cm. Attenuation loss through volume defects (inhomogeneity, micro-bubbles) must also be kept to a minimum. In addition to certain technological requirements such as the production of layers and structurability, in particular thermal and thermo-mechanical stability, matched expansion coefficients and less shrinking are prerequisites for the use of polymers as waveguide structures in integrated optics.

For many of the above-mentioned uses of optical polymers, long-term thermal stability of the mechanical and optical qualities in the temperature range from $\geq 80°$ C. is especially desirable. Known simple thermoplastic polymers with good optical qualities, such as polymethylmethacrylate or polycarbonate, are suitable for such long-term application temperatures. The glass transition temperature only lies in the range approximately 105 to 130° C. so that long-term stability is no longer guaranteed.

Polymers with a glass transition temperature $\geq 180°$ C. are advantageous for such applications. Some examples of such high-performance plastics are polyimides, polyetherimides, polyarylsulfones, polyaryletherketones or polyarylethersulfones. However, these plastics are generally difficult or expensive to process, due to their relatively restricted solubility or complicated temperature management. The application of these high $T_g$ polymers for optical systems is described in various patents, such as JP-A-61-144738, JP-A-61-005986, DE-A-3915734, U.S. Pat. No. 4,477,555, EP-A-0254275, DE-A-3429074, DE-A-3927498, DE-A-4228853, and DE-A-3636399. Another disadvantage of these systems is the relatively high optical absorption in the wavelengths of 1.3 and 1.5 μm used in telecommunications technology. In addition, these materials are often characterized by high double refraction. Very low optical absorption is found in polycyanurates (DE-C-4435992); however, these high temperature network polymers do not always have satisfactory removability from the mold when they are processed by stamping or casting techniques. As a result, technologically advantageous processing is very difficult using these techniques.

It is also known that polyesters are characterized by good optical qualities, see EP-A-0 242 959, EP-A-0 184 716, and EP-A-0 076 133. However, only fully aromatic polyesters or polyarylates have a glass transition temperature $\geq 180°$ C. Polyarylates tend to go through partially crystalline, liquid crystalline or crystalline phases, which would clearly limit its use as an optical material, due to the resulting high scattering loss. The above-mentioned patents also describe only optically anisotropic polyesters. Isotropic, amorphous polyesters are required for use as optically transparent materials, e.g. in optical communications technology.

Isotropic polyesters that contain 9,9-Bis[4-(2-hydroxyethoxy)phenyl]fluorene as diolcomponents are also described, see EP-A-0 653 451, EP-A-0 396 418, and EP-A-0 380 027. However, these have relatively high optical losses in the wavelengths used in communications technology, and some have significantly low glass transition temperatures.

The task of the present invention was therefore to select polyesters that are created from as simple as possible monomer components, which on the one hand have a glass transition temperature $\geq 180°$ C., have low optical absorption at 1.3 and 1.5 μm, and are easy to process. On the other hand, they should not have crystalline, partial, or liquid crystal phases and should be capable of being processed into optical elements.

Surprisingly, this task was solved by the use of fully aromatic polyesters, in particular copolyarylates, predominantly of known basic components. The methods for the synthesis of such polyesters, e.g. using water extracion agents, converting dicarbonic acids into bisphenoles or bisphenolates into dicarbonic acid dichlorides, are known.

The fully aromatic polyester used in accordance with the present invention, with a glass transition temperature $T_g \geq 180°$ C., are preferably fully aromatic copolyarylates. Of course, homopolyarylates can also be used. In particular, the aromatic dicarbonic acids and aromatic dihydroxy compounds listed below can be used as components for the fully aromatic polyesters.

The discovered copolyarylates are preferably obtained from mixtures of aromatic dicarbonic acids and aromatic dihydroxy compounds. These polyarylates are characterized by optically virtually amorphous qualities, good solubility in lacquer solvents, low optical absorption at 1.3 and 1.5 μm, and good film formation. The glass transition temperature for these copolyarylates is above 180° C.

Especially well suited for the optical elements in accordance with the present invention are dicarbonic acids based on the following structures

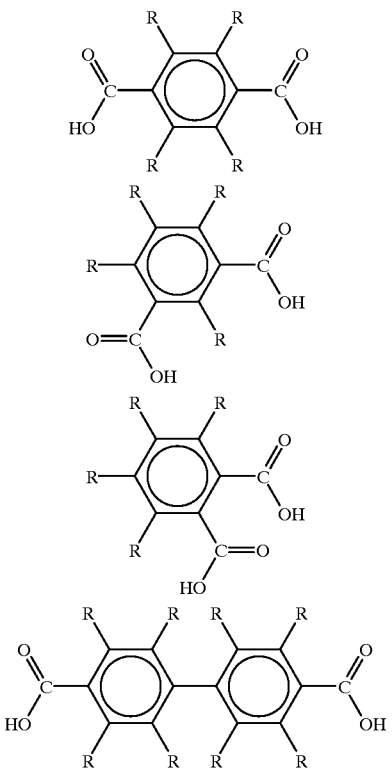

in which R stands for hydrogen or fluoride

The aromatic dihydroxy compounds are preferably of the following structures:

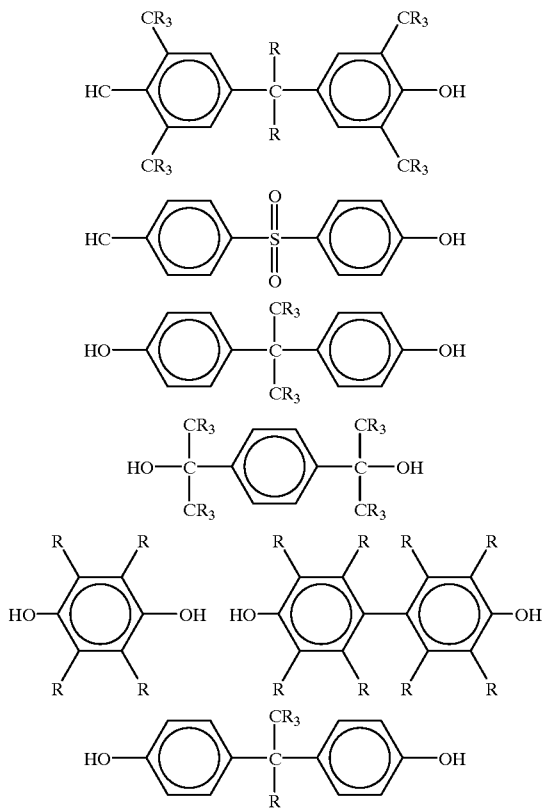

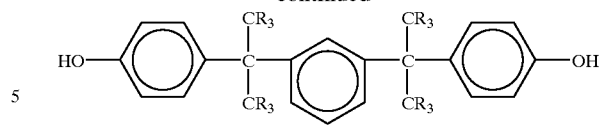

in which R can stand for H or F.

Generally suited for the production of the polyesters for use in accordance with the present invention are polyester derivatives of benzene, napthaline, biphenyl, diphenyl-ethers, diphenyl-sulfone and diphenyl-methane, each with 2 hydroxy or carboxy functions. These can have one or several hydrogen atoms and/or fluorine atoms and/or methyl groups and/or trifluorenethyl groups as substituents.

The polyester used in accordance with the present invention should have a molecular weight in the range of 8,000 to 250,000, preferably from 12,000 to 120,000.

The copolyesters produced in a polycondensation reaction have a glass transition temperature $T_g \geq 180°$ C. They are well soluble in common lacquer solvents, such as cyclohexanon, ethoxyethylacetate and methoxypropylacetate, and can be processed into transparent films or layers through spin coating or dip coating. Their refractive index at 633 nm is 1.4 to 1.6, preferably in the range from 1.45 to 1.57. In accordance with the present invention, under certain copolyester compounds it is possible to obtain amorphous, non-crystalline polymers that have little scattering at 1.3 and 1.5 $\mu$m. The optical losses at these wavelengths were determined to be 0.1 to 0.5 dB/cm.

Although the polycondensation method for the manufacture of polyesters is previously known, it is especially advantageous in producing non-crystalline, amorphous, non-scattering optical materials with the above-mentioned copolyester compounds.

These copolyesters are suitable for the manufacture of waveguide structures, lenses, prisms, corrected lens systems, optical fibers and carriers for optical layers as well as for numerous other purposes.

The discovered, amorphous copolyesters can be obtained by copolycondensating mixtures of aromatic dicarbonic acids with mixtures of aromatic dihydroxy compounds. Especially the above-mentioned monomer components yield non-crystalline, amorphous, polymers. The refractive index of the described copolyesters can be set through variation of the composition of the copolymer so that the refractive index can be specifically adjusted to certain requirements, for example substrate, waveguide configuration, adjusting to core and coating material. The copolymer in accordance with the present invention has a glass transition temperature in the range of 180 to 270° C., however, between 180 and 220° C. is especially preferred. The described polyester materials have very little loss at 1.3 and 1.5 $\mu$m in the range of 0.1 to 0.5 dB/cm.

The easy processability of the materials in accordance with the present invention is highly soluble in common lacquer solvents, such as cyclohexanon, ethoxyethylacetate and methoxypropylacetate, and can therefore be processed into optical layers or film through spin coating or dip coating.

High solid lacquers with thixotropic setting can be produced from the described copolyesters, which lacquers allow for processing through screen-printing. On this basis, optical chips can be produced inexpensively in accordance with the molding formation written below. The copolyesters in accordance with the present invention can also be processed using casting and stamping techniques, or using injection molding.

The invention is explained in more detail below on the basis of two examples.

EXAMPLES

Example 1

34.74 g LiBr are dissolved in 600 ml pyridines (absolute) at low heat. A solution of 139.69 g phosphoric acid diphenylesterchloride in 50 ml pyridine is added to this solution. A mixture of 16.612 g isophthalic acid and 16.612 9 terephthalic acid dissolved in 400 ml pyridine is added to this solution. The solution is then stirred for 20 minutes at ambient temperature, and then for 10 minutes at 120° C. Within 10 to 15 minutes, a solution of 67.25 g 4,4'-hexafluoro-isopropylidenebisphenol is dropped in 250 ml pyridine and stirred for three hours at 120° C. The polyester is precipitated in methanol, filtered, and washed with methanol. This yields 86 g (92.2% d. Th.).

The polyester obtained through this method has a molecular weight of 48,000 g/mol and a glass transition temperature of 209° C. Amorphous, optically isotropic films in the μm range are obtained from methoxypropylacetate through spin coating. An optical absorption of 0.44 dB/cm at 1.55 μm and a refractive index of 1.540 at 633 nm is measured in planar waveguides.

Example 2

10 mmol 4,4'-hexafluoro-isopropylidenebisphenol and 60 mg benzyltriethylammonium chloride are dissolved in 21.2 ml of 1 molar caustic soda at 52° C. 5 mmol terephthalic acid dichloride and 5 mmol isophthalic acid dichloride dissolved in 23 ml methylene chloride is added to this solution, with heavy stirring. After 40 minutes, the obtained polyester is precipitated in slightly hydrochloric hot water. The precipitated product is washed with hot water and is dried. The obtained polyester is cleaned by dissolution in THF and precipitation in methanol. 3.88 g polyester are isolated (83.2% d. Th.). The obtained polyester has a molecular weight of 107.220 g/mol and a glass transition temperature of 225° C. Amorphous, optically isotropic films in the μm range are obtained from methoxypropylacetate through spin coating. An optical absorption of 0.45 dB/cm at 1.55 μm and a refractive index of 1.540 at 633 nm is measured in planar waveguides.

Example 3

12.5 mmol 4,4'-hexafluoro-isopropylidenebisphenol and 75.2 mg benzyltriethylammonium chloride are dissolved in 26.5 ml 1 molar caustic soda at 5° C. 6.25 mmol tetrafluoroterephthalic acid dichloride and 6.25 mmol tetrafluoroisophthalic acid dichloride are dissolved in 30 ml methylene chloride, with heavy stirring. After 40 minutes, the obtained polyester is washed in slightly hydrochloric water and is dried. The obtained polyester is cleaned by dissolution in THF and precipitated in methanol. 5.9 g polyester are isolated (87.7% d. Th.) The obtained polyester has a molecular weight of 18,200 g/mol and a glass transition temperature of 148° C. Amorphous, optically isotropic films in the μm range are obtained from methoxypropylacetate through spin coating. An optical absorption of 0.32 dB/cm at 1.55 μm and a refractive index of 1.5139 at 633 nm is measured in planar waveguides.

What is claimed is:

1. Optical elements made of an optically isotropic plastic, characterized in that the plastic is a fully aromatic polyester without ether function and with a glass transition temperature $T_g \geq 180°$ C. and the optical elements have a refraction index of 1.4 to 1.57 at 630 nm.

2. Optical elements as claimed in claim 1, characterized in that the plastic is a fully aromatic copolyester.

3. Optical elements as claimed in claim 1, characterized in that the fully aromatic polyester contains at least one aromatic carboxylic acid of the following formulas:

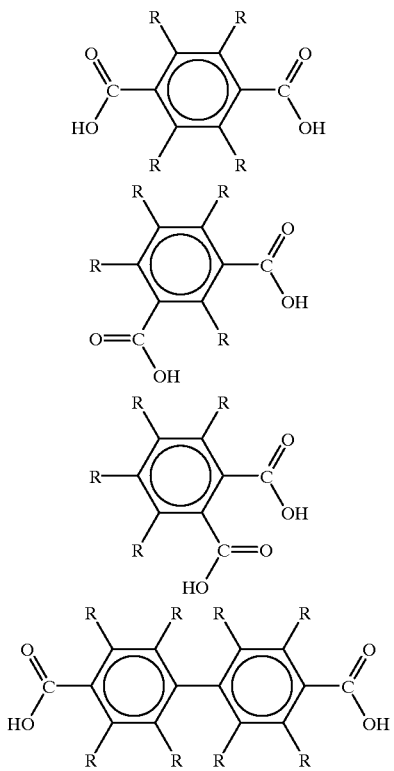

where R stands for H or F.

4. Optical elements as claimed in claim 1, characterized in that the fully aromatic polyester contains at least one aromatic polyalcohol of the following formulas:

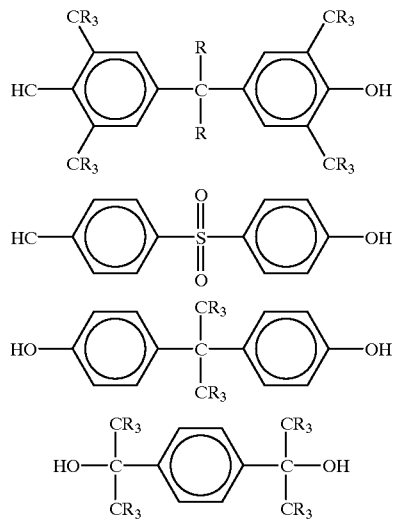

-continued

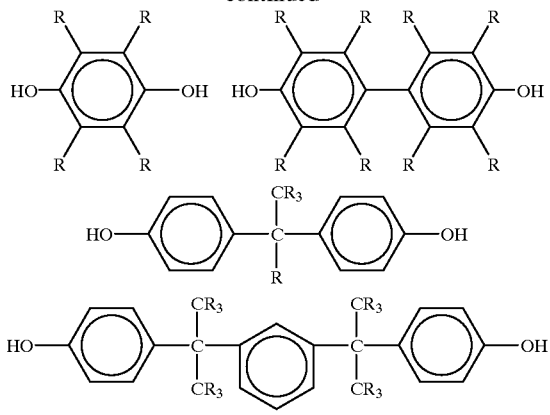

where R stands for H or F.

5. Optical elements as claimed in claim 1, characterized by a glass transition temperature $T_g$ of 180 to 270° C.

6. Optical elements as claimed in claim 1, characterized by an optical attenuation of 0.1 to 1 dB/cm at 1.3 and 1.5 μm.

7. Optical elements in accordance with any of the preceding claims, characterized in that the refraction index is from 1.45 to 1.57 at 630 nm.

8. Optical elements as claimed in claim 1, characterized in that the fully aromatic polyester has a molecular weight in the range of 8,000 to 250,000.

9. Optical elements as claimed in claim 1, characterized in that they were obtained by spin coating or dip coating the dissolved, fully aromatic polyester in a suitable solvent.

10. Optical elements as claimed in claim 1, characterized in that they are obtained from the dissolved, fully aromatic polyester using casting or stamping technique.

11. Waveguide structures, lenses, prisms, corrected lens systems, optical fibers and carriers for optical layers made from a full aromatic polyester as defined in claim 1.

12. Varnishes for manufacturing optical elements as claimed in claim 1, characterized in that they contain the fully aromatic polyester dissolved in a suitable solvent.

13. Optical elements as claimed in claim 1, characterized by a glass transition temperature $T_g$ of 180 to 220° C.

14. Optical elements as claimed in claim 1, characterized by an optical attenuation of 0.1 to 0.5 dB/cm at 1.3 and 1.5 μm.

15. An adhesive for optical components, comprising a fully aromatic polyester as defined claim 1.

* * * * *